UNITED STATES PATENT OFFICE.

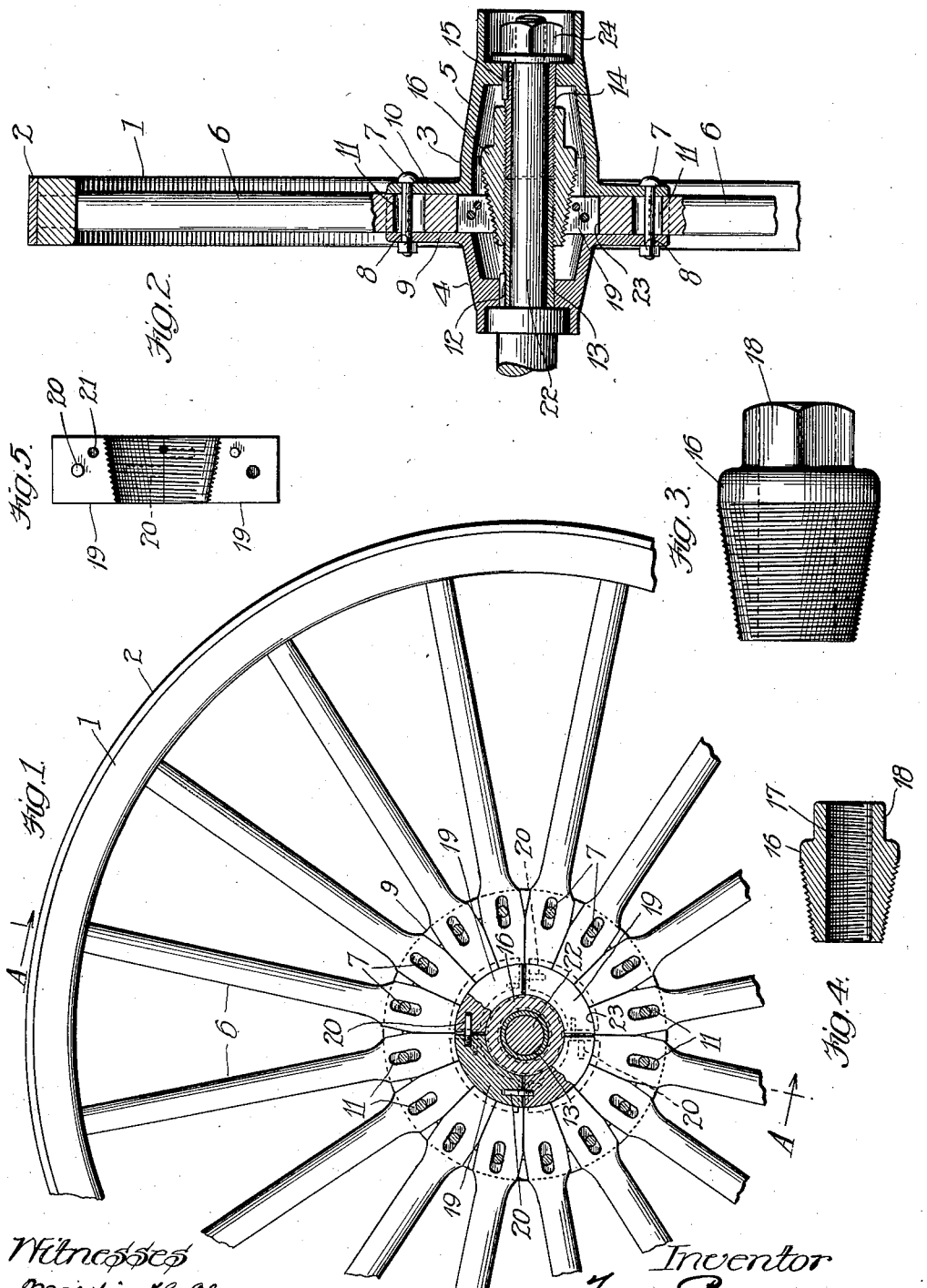

TONY POSS, OF AURORA, ILLINOIS.

VEHICLE-WHEEL.

1,078,164.　　　　Specification of Letters Patent.　　Patented Nov. 11, 1913.

Application filed February 12, 1913. Serial No. 747,904.

*To all whom it may concern:*

Be it known that I, TONY POSS, a citizen of the United States of America, and a resident of Aurora, county of Kane, and State of Illinois, have invented certain new and useful Improvements in Vehicle-Wheels, of which the following is a specification.

This invention relates in general to means for clamping together a pair of circular members, one of which is expansible within or without the other member. For example, take a wheel and its tire, the wheel being expansible within the tire for the purpose of clamping the latter thereto.

The main objects of this invention are to provide a wheel having spokes and a hub, with means movably mounted within the hub for simultaneously forcing the spokes outward radially with respect to the wheel hub and thereby expanding the wheel against its tire; to provide in a device of this class an expansible nut having a conical threaded aperture, and a conical expander adapted to be threaded into said nut; to provide a conical expanding member having threaded engagement with a part of the hub, or a part rigid with the hub of a wheel, whereby the expanding member may be turned with respect to a hub and caused to wedge between the inner ends of the spokes and thus expand the wheel; and to provide a wheel construction which may be quickly assembled or dismantled through the agency of a conical member adapted to be forced between the inner ends of the spokes of the wheel and retained in such position.

An illustrative embodiment of this invention is shown in the accompanying drawings, in which—

Figure 1 is a side elevation, partly in section, of a vehicle wheel constructed according to this invention. Fig. 2 is a sectional view of the wheel taken on the line A—A of Fig. 1. Fig. 3 is a detail side elevation of a wheel expanding device. Fig. 4 is a longitudinal sectional view of the expanding device. Fig. 5 is a detail of two sectors, a plurality of which form an expanding nut.

This invention is adaptable to purposes analogous to the specific one here described and shown in the drawings involving the clamping of two members, one of which is expansible with respect to the other, or the invention might be modified to effect a clamping engagement between two members by causing one to contract around the other. It will also be apparent from the following description that the invention is applicable to many different types of vehicle wheels and tires.

In the drawings the rim of an ordinary wagon wheel is indicated by the numeral 1. This rim carries the usual metallic tire 2 surrounding its outer edge. The hub 3 of the wheel is made in two parts 4 and 5 and these parts are clamped to the inner ends of spokes 6 by bolts 7 passing through holes 8 in the flanges 9 and 10 of the hub, and elongated slots 11 in the spokes 6. Keyed to the hub section 4 by a key 12 is a tube 13 which has a right hand thread on its exterior surface. A similar tube 14 is keyed to the hub section 5 by a key 15 and the exterior of this tube is provided with a left hand thread. In engagement with the threads of the tubes 13 and 14 is a threaded member 16 having a hollow cylindrical aperture 17, as shown in Fig. 4. The walls of the aperture 17 are oppositely threaded from the ends of the member 16 so as to coact with the threads on the tubes 13 and 14.

The member 16 serves as a wheel expanding device and for this purpose is substantially conical in outline, or rather forms a cone frustum provided with a prismatic head 18 whereby it may be engaged and turned by a wrench. The tapered surface of the expanding device 16 is threaded to engage the interior threads of coacting sectors 19, a plurality of which form an expansible nut with a conical aperture in its center to fit the expander 16.

The sectors 19 are slidably mounted with respect to each other by pins 20 tapped therein and slidably fitting in holes 21 in adjacent sectors. It will thus be seen that the sectors 19 may move radially for a limited distance with respect to the wheel axle 22. When so moved they will engage the inner edges 23 of the spokes 6, causing the same to expand the rim 1.

In the present case it will be assumed that axle 22 is stationary and that the wheel rotates around the axle, all of the before mentioned parts, namely, the tubes 13 and 14, the expander 16, the sectors 19, and remaining parts of the wheel rotating as a unit. The usual nut which retains the wheel on the axle is indicated by the numeral 24.

To adjust the member 16 for the purpose of expanding the wheel and thereby firmly clamp it to tire 2, it is necessary first to remove nut 24 and bolts 7. The section 5 of the hub may then be turned to the right thereby turning tube 14 and disengaging it from the expander 16. When the tube 14 and the hub section 5 are removed, the expander 16, by means of a wrench engaging the head 18, may be turned in a right hand direction thereby causing it to travel to the left (Fig. 2) with respect to the wheel and sectors 19 and cause the sectors 19 to be spread apart and forced into engagement with the inner edges of spokes 6, thereby forcing the spokes outwardly and expanding the wheel against its tire 2. The sectors 19 in Fig. 1 are shown by dotted lines in moved positions as they would appear after an operation of the member 16 as described. The turning of member 16 may cause it to travel to the left along tube 13 if this tube is held stationary at such time and provided the thread on the tube 13 is the same as the exterior thread on the expanding device 16. If the tube 13 and hub section 4 are permitted to rotate with the expanding device 16 then after the expanding device comes to rest in its desired position it is necessary to turn the hub section 4 to the right until the flange 9 of the hub engages the spokes 6. The tube 14 now is engaged with the corresponding thread in the member 16 and with the hub section 5 is turned in a left hand direction until the inner end of the tube 14 meets the inner end of the tube 13 at which point the flange 10 will engage the spokes 6 and the bolts 7 may again be replaced.

In the rotation of the wheel with respect to its axle the expanding member 16 has no tendency to rotate relatively of the wheel as it is not in frictional engagement with any stationary member, but even accidental rotation of the member 16 is made impossible by the tubes 13 and 14, because of their respective right and left hand threads engaging the corresponding threads in the interior of member 16. A turning of the expanding device 16 when the wheel is assembled as shown in Fig. 2, would cause the tubes 13 and 14 to approach each other or move farther apart. The first is impossible because the tubes are substantially in contact, and the second movement is prevented by the bolts 7.

In a wheel construction such as the present, it is not necessary to provide special means for fastening tires to their wheels or in the case of metallic tires to shrink them onto the wheels, as this end may be attained by an adjustment of the expanding device 16 when the wheels are assembled. Also if any parts of the wheel become broken the wheel may be easily disassembled as before described, so that any spoke or other part may be replaced without requiring skilled handling or any other tools than a wrench. With this device the wooden parts of a wheel may be permitted to contract or may be expanded as desired when extreme changes in temperature cause a contraction or expansion of the metal tire 2. It may also be seen that the exterior threads on the member 16 and the interior threads on the sectors 19 are not essential to the operation of the device, as the member 16 may be adjusted as required by turning it relatively of the tube 13. A slight adjustment of the expander 16 causes a comparatively considerable change in the length of the circumference of the wheel, and for this reason there need be but slight taper to the member 16 and the aperture formed in the sectors 19.

Although but one specific embodiment of this invention has been herein shown and described, it will be understood that numerous details of the construction shown may be altered or omitted without departing from the spirit of this invention as defined by the following claims.

I claim:—

1. In a device of the class described, the combination with a conical member having an exterior thread and an axial passage extending through said member, the walls of said passage having a right hand thread in one end and a left hand thread in the other end, cylindrical members having right and left hand threads for respectively engaging said right and left hand threads of said conical member, an expansion nut having a conical aperture the walls of which are threaded to engage the exterior thread of said conical member, and means for preventing relative rotation between said conical member and said cylindrical members.

2. In a device of the class described, the combination with a conical member having an exterior thread and an axial passage extending through said member, the walls of said passage having a right hand thread in one end and a left hand thread in the other end, cylindrical members having right and left hand threads for respectively engaging said right and left hand threads of said conical member and an expansion nut having a conical aperture the walls of which are threaded to engage the exterior thread of said conical member.

3. A wheel comprising a rim and spokes, a hollow hub formed in two parts clamped to the inner ends of said spokes, an inwardly extending tube fixed to each of said parts, said tubes being oppositely threaded, a conical member threaded to receive the ends of said tubes, and an expansible device consisting of a plurality of sectors between said conical member and the inner ends of said spokes.

4. In a device of the class described, the combination with a conical member having an exterior thread and an axial passage extending through said member, the walls of said passage having right and left threads, threaded cylindrical members respectively engaging the right and left threads of said walls, and an expansion nut having a conical aperture the walls of which are threaded to engage the exterior thread of said conical member.

Signed at Chicago this 8th day of February 1913.

TONY POSS.

Witnesses:
 JENNIE BURT,
 RUDOW RUMMLER.

Copies of this patent may be obtained for five cents each, by addressing the "Commissioner of Patents, Washington, D. C."